United States Patent
Takano (10) Patent No.: US 7,106,478 B2
(45) Date of Patent: Sep. 12, 2006

(54) IMAGE PROCESSING DEVICE AND METHOD FOR CONTROLLING THE SAME

(75) Inventor: Gaku Takano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 938 days.

(21) Appl. No.: 10/055,003

(22) Filed: Jan. 25, 2002

(65) Prior Publication Data

US 2003/0142372 A1  Jul. 31, 2003

(51) Int. Cl.
*H04N 2/407* (2006.01)

(52) U.S. Cl. ............... 358/3.26; 358/1.9; 382/260; 382/274

(58) Field of Classification Search ............... 358/3.26, 358/1.9; 382/260, 274, 168
See application file for complete search history.

(56) References Cited

U.S. PATENT DOCUMENTS

| | | | |
|---|---|---|---|
| 6,897,983 B1 * | 5/2005 | Kawano | 358/3.26 |
| 6,940,620 B1 * | 9/2005 | Jogo | 358/3.26 |
| 2002/0145745 A1 * | 10/2002 | Kanno | 358/1.9 |
| 2002/0172431 A1 * | 11/2002 | Atkins et al. | 382/260 |
| 2003/0026494 A1 * | 2/2003 | Woodell et al. | 382/260 |

* cited by examiner

*Primary Examiner*—Douglas Q. Tran
*Assistant Examiner*—Negussie Worku
(74) *Attorney, Agent, or Firm*—Foley & Lardner LLP (57) ABSTRACT

An image input module inputs image signals which have different sampling rates. Based on a predetermined processing flow, a filter processing module carries out a filter processing by a predetermined filter factor on the image signals which are inputted by the image input module. A plurality of filter factors which are used at the filter processing module are set at a filter factor setting module. A filter factor selecting module selects, from among a plurality of filter factors, an appropriate filter factor in accordance with the sampling rates of the image signals and the processing flow, and supplies them to the filter processing module.

15 Claims, 4 Drawing Sheets

FIG. 1

Image data window 13×13   pixel of interest p6,6

FIG. 2

Filter factor 1

IMAGE PROCESSING DEVICE AND METHOD FOR CONTROLLING THE SAME

BACKGROUND OF THE INVENTION

1. Field of the Invention

The present invention relates to an image processing device and a method for controlling the same, and in particular, to an image processing device and a method for controlling the same which employ a technique which is applied to filter processing in an image processing section of an image forming device, such as a color image copier or the like, which handles image signals of different sampling rates.

2. Description of the Related Art

In a conventional color image copier, three-channel image signals such as RGB signals are read out by a charge coupled device (CCD) or the like at the same sampling rate, and are processed in an image processing section at a latter stage.

Thus, at a filter included in the image processing section, frequency characteristics, such as a cut-off frequency and the like, which are appropriate for only that sampling rate are set.

Moreover, when a line sensor (CCD), which outputs image signals of plural channels having different sampling rates, is used as image input means, a Nyquist frequency changes in accordance with the sampling rate. Thus, functions such as elimination of moire and the like cannot be realized with the same filter factor.

In particular, when an image, to which a screen (dots) has been applied, is inputted such as a document manuscript by dot printing, at a time of a low sampling rate, the Nyquist frequency is lower than the screen frequency. Sampling is carried out with a periodic configuration of the manuscript image being bent back with the Nyquist frequency in the center.

On the other hand, at a time of a high sampling rate, there are cases in which the Nyquist frequency is higher than the frequency of the periodic configuration of the input image (the number of dot lines of the printed manuscript).

In this way, when the Nyquist frequency changes in accordance with the sampling rate of the input image signal, at the filter processing section, functions such as the elimination of moire and the like cannot be realized when filter processing is carried out at the same filter factor. Thus, a separate, excessive un-sharpness processing is required, and the problem arises that this is not always preferable from the standpoint of cost performance.

BRIEF SUMMARY OF THE INVENTION

An object of the present invention is to provide an image processing device and a method for controlling the same, in order to overcome the above-described problematic points, by making it possible to select a filter factor which has appropriate frequency characteristics in accordance with the sampling rate and a processing flow of an input image signal, thus moire can be suppressed without the need for an excessive un-sharpness processing.

In order to achieve the above-described object, according to a first aspect of the present invention, there is provided an image processing device comprising:

an image input module which inputs image signals having different sampling rates;

a filter processing module which, based on a predetermined processing flow, carries out filter processing by a predetermined filter factor on the image signals which are inputted by the image input module;

a filter factor setting module at which a plurality of filter factors which are used in the filter processing module are set; and a filter factor selecting module which selects, from among the plurality of filter factors at the filter factor setting module, an appropriate filter factor in accordance with the sampling rates of the image signals which are inputted by the image input module and a processing flow at the filter processing module, and supplies them to the filter processing module.

Further, according to a second aspect of the present invention, there is provided an image processing device according to the first aspect in which the filter processing by the predetermined filter factor at the filter processing module is linear filter processing, and the filter factor selecting module selects, as the appropriate filter factor, a filter factor to switch a filter frequency characteristic in the linear filter processing by the filter processing module.

Further, according to a third aspect of the present invention, there is provided an image processing device according to the second aspect in which a filter factor to switch the filter frequency characteristic which is selected by the filter factor selecting module is a filter factor to switch a cutoff frequency.

Further, according to a fourth aspect of the present invention, there is provided an image processing device comprising:

an image input module which inputs a first image signal having a predetermined sampling rate and a second image signal having a sampling rate which is higher than the sampling rate of the first image signal;

a filter processing module which, based on a predetermined processing flow, carries out linear filter processing by a predetermined filter factor on the first and second image signals which are inputted by the image input module;

a filter factor setting module at which a plurality of filter factors which are used in the filter processing module are set; and a filter factor selecting module which selects, from among the plurality of filter factors at the filter factor setting module, as a filter factor in linear filter processing by the filter processing module, an appropriate filter factor in accordance with the sampling rates of the first and second image signals which are inputted by the image input module and a processing flow at the filter processing module, and supplies them to the filter processing module.

Further, according to a fifth aspect of the present invention, there is provided an image processing device according to the fourth aspect in which the filter factor in the linear filter processing which is selected by the filter factor selecting module is a filter factor to switch a cutoff frequency.

Further, according to a sixth aspect of the present invention, there is provided an image processing device according to the fifth aspect in which the filter factor in the linear filter processing which is selected by the filter factor selecting module is a filter factor to make a cutoff frequency for the first image signal lower than a cutoff frequency for the second image signal.

Further, according to a seventh aspect of the present invention, there is provided an image processing device according to the fifth aspect in which the filter factor in the linear filter processing which is selected by the filter factor selecting module is a filter factor to make a cutoff frequency for the first image signal lower than a frequency in which a main frequency component of an inputted image signal is subtracted from twice a vector which expresses a Nyquist frequency at a time of processing the first image signal, and to make a cutoff frequency for the second image signal lower than the main frequency of the inputted image signal.

Further, according to a eighth aspect of the present invention, there is provided an image processing device according to the fifth aspect in which the filter factor in the linear filter processing which is selected by the filter factor selecting module is a filter factor to make a cutoff frequency for the first image signal lower than a frequency in which a number of screen lines of a manuscript which presents the first image signal is subtracted from twice a vector which expresses a Nyquist frequency at a time of processing the first image signal, and to make a cutoff frequency for the second image signal lower than the number of screen lines of the manuscript.

Further, according to a ninth aspect of the present invention, there is provided an image processing device comprising:

image input means for inputting image signals having different sampling rates;

filter processing means for carrying out, based on a predetermined processing flow, a filter processing by a predetermined filter factor on the image signals which are inputted by the image input means;

filter factor setting means at which a plurality of filter factors which are used in the filter processing means are set; and filter factor selecting means for selecting, from among a plurality of filter factors at the filter factor setting means, an appropriate filter factor in accordance with the sampling rate of the image signal which is inputted by the image input means and a processing flow at the filter processing means, and for supplying them to the filter processing means.

Further, according to a tenth aspect of the present invention, there is provided an image processing device according to the ninth aspect in which the filter processing by the predetermined filter factor at the filter processing means is a linear filter processing, and the filter factor selecting means selects, as the appropriate filter factor, a filter factor to switch a filter frequency characteristic in the linear filter processing by the filter processing means.

Further, according to a eleventh aspect of the present invention, there is provided an image processing device according to the tenth aspect in which the filter factor to switch the filter frequency characteristic which is selected by the filter factor selecting means is a filter factor to switch a cutoff frequency.

Further, according to a twelfth aspect of the present invention, there is provided an image processing device comprising:

image input means for inputting a first image signal having a predetermined sampling rate and a second image signal having a sampling rate which is higher than the sampling rate of the first image signal;

filter processing means for carrying out, based on a predetermined processing flow, a linear filter processing by a predetermined filter factor on the first and second image signals which are inputted by the image input means;

filter factor setting means at which a plurality of filter factors which are used in the filter processing means are set; and filter factor selecting means for selecting, from among the plurality of filter factors at the filter factor setting means and as a filter factor in the linear filter processing by the filter processing means, an appropriate filter factor in accordance with the sampling rates of the first and second image signals which are inputted by the image input means and a processing flow at the filter processing means, and for supplying them to the filter processing means.

Further, according to a thirteenth aspect of the present invention, there is provided an image processing device according to the twelfth aspect in which the filter factor in the linear filter processing which is selected by the filter factor selecting means is a filter factor to switch a cutoff frequency.

Further, according to a fourteenth aspect of the present invention, there is provided an image processing device according to the thirteenth aspect in which the filter factor in the linear filter processing which is selected by the filter factor selecting means is a filter factor to make a cutoff frequency for the first image signal lower than a cutoff frequency for the second image signal.

Further, according to a fifteenth aspect of the present invention, there is provided an image processing device according to the thirteenth aspect in which the filter factor in the linear filter processing which is selected by the filter factor selecting means is a filter factor to make a cutoff frequency for the first image signal lower than a frequency in which a main frequency component of an inputted image signal is subtracted from twice a vector which expresses a Nyquist frequency at a time of processing the first image signal, and to make a cutoff frequency for the second image signal lower than the main frequency of the inputted image signal.

Further, according to a sixteenth aspect of the present invention, there is provided an image processing device according to the thirteenth aspect in which the filter factor in the linear filter processing which is selected by the filter factor selecting means is a filter factor to make a cutoff frequency for the first image signal lower than a frequency in which a number of screen lines of a manuscript which presents the first image signal is subtracted from twice a vector which expresses a Nyquist frequency at a time of processing the first image signal, and to make a cutoff frequency for the second image signal lower than the number of screen lines of the manuscript.

Further, according to a seventeenth aspect of the present invention, there is provided a method for controlling an image processing device which carries out a filter processing on an image signal which is inputted, the method comprising:

inputting image signals having different sampling rates;

carrying out, based on a predetermined processing flow, a filter processing by a predetermined filter factor on the image signals;

setting a plurality of filter factors which are used in the filter processing; and selecting, from among the plurality of filter factors, an appropriate filter factor in accordance with the sampling rates of the image signals and a processing flow, and supplying them to the filter processing.

Further, according to a eighteenth aspect of the present invention, there is provided a method for controlling an image processing device according to the seventeenth aspect in which the filter processing by the predetermined filter factor is linear filter processing, and a filter factor to switch a filter frequency characteristic in the linear filter processing is selected as the appropriate filter factor in the filter processing.

Further, according to a nineteenth aspect of the present invention, there is provided a method for controlling an image processing device according to the eighteenth aspect in which the filter factor to switch the filter frequency characteristic is a filter factor to switch a cutoff frequency.

In order to achieve the above-described object, according to a twentieth aspect of the present invention, there is provided a method for controlling an image processing device which carries out a filter processing on an image signal which is inputted, the method comprising:

inputting a first image signal having a predetermined sampling rate and a second image signal having a sampling rate which is higher than the sampling rate of the first image signal;

carrying out, based on a predetermined processing flow, a linear filter processing by a predetermined filter factor on the first and second image signals;

setting a plurality of filter factors which are used in the linear filter processing; and selecting, from among the plurality of filter factors, as a filter factor in the linear filter processing, an appropriate filter factor in accordance with the sampling rates of the first and second image signals and the processing flow, and supplying them to the linear filter processing.

Further, according to a twenty-first aspect of the present invention, there is provided a method for controlling an image processing device according to the twentieth aspect in which the filter factor in the linear filter processing is a filter factor to switch a cutoff frequency.

Further, according to a twenty-second aspect of the present invention, there is provided a method for controlling an image processing device according to the twenty-first aspect in which the filter factor in the linear filter processing is a filter factor to make a cutoff frequency for the first image signal lower than a cutoff frequency for the second image signal.

Further, according to a twenty-third aspect of the present invention, there is provided a method for controlling an image processing device according to the twenty-first aspect in which the filter factor in the linear filter processing is a filter factor to make a cutoff frequency for the first image signal lower than a frequency in which a main frequency component of an inputted image signal is subtracted from twice a vector which expresses a Nyquist frequency at a time of processing the first image signal, and to make a cutoff frequency for the second image signal lower than the main frequency of the inputted image signal.

Further, according to a twenty-fourth aspect of the present invention, there is provided a method for controlling an image processing device according to the twenty-first aspect in which the filter factor in the linear filter processing is a filter factor to make a cutoff frequency for the first image signal lower than a frequency in which a number of screen lines of a manuscript which presents the first image signal is subtracted from twice a vector which expresses a Nyquist frequency at a time of processing the first image signal, and to make a cutoff frequency for the second image signal lower than the number of screen lines of the manuscript.

CORRESPONDING EMBODIMENTS

The first, ninth, and seventeenth aspects of the present invention in the above correspond to a first embodiment and a modified example of the first embodiment which will be described later.

Further, the second, tenth, and eighteenth aspects of the present invention in the above correspond to the first embodiment which will be described later.

Further, the third, eleventh, and nineteenth aspects and the fifth, thirteenth, and twenty-first aspects of the present invention in the above correspond to a third modified example of a second embodiment which will be described later.

Further, the fourth, twelfth, and twentieth aspects of the present invention in the above correspond to the first embodiment and the second embodiment which will be described later.

Further, the sixth, fourteenth, and twenty-second aspects of the present invention in the above correspond to a second modified example of the second embodiment which will be described later.

Further, the seventh, fifteenth, and twenty-third aspects of the present invention in the above correspond to the second modified example of the second embodiment which will be described later.

Further, the eighth, sixteenth, and twenty-fourth aspects of the present invention in the above correspond to a first modified example of the second embodiment which will be described later.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Reference will now be made in detail to the presently preferred embodiments of the invention as illustrated in the accompanying drawings, in which like reference numerals designate like or corresponding parts.

Hereinafter, embodiments of an image processing device of the present invention will be described with reference to the figures.

FIRST EMBODIMENT

Figure 1:
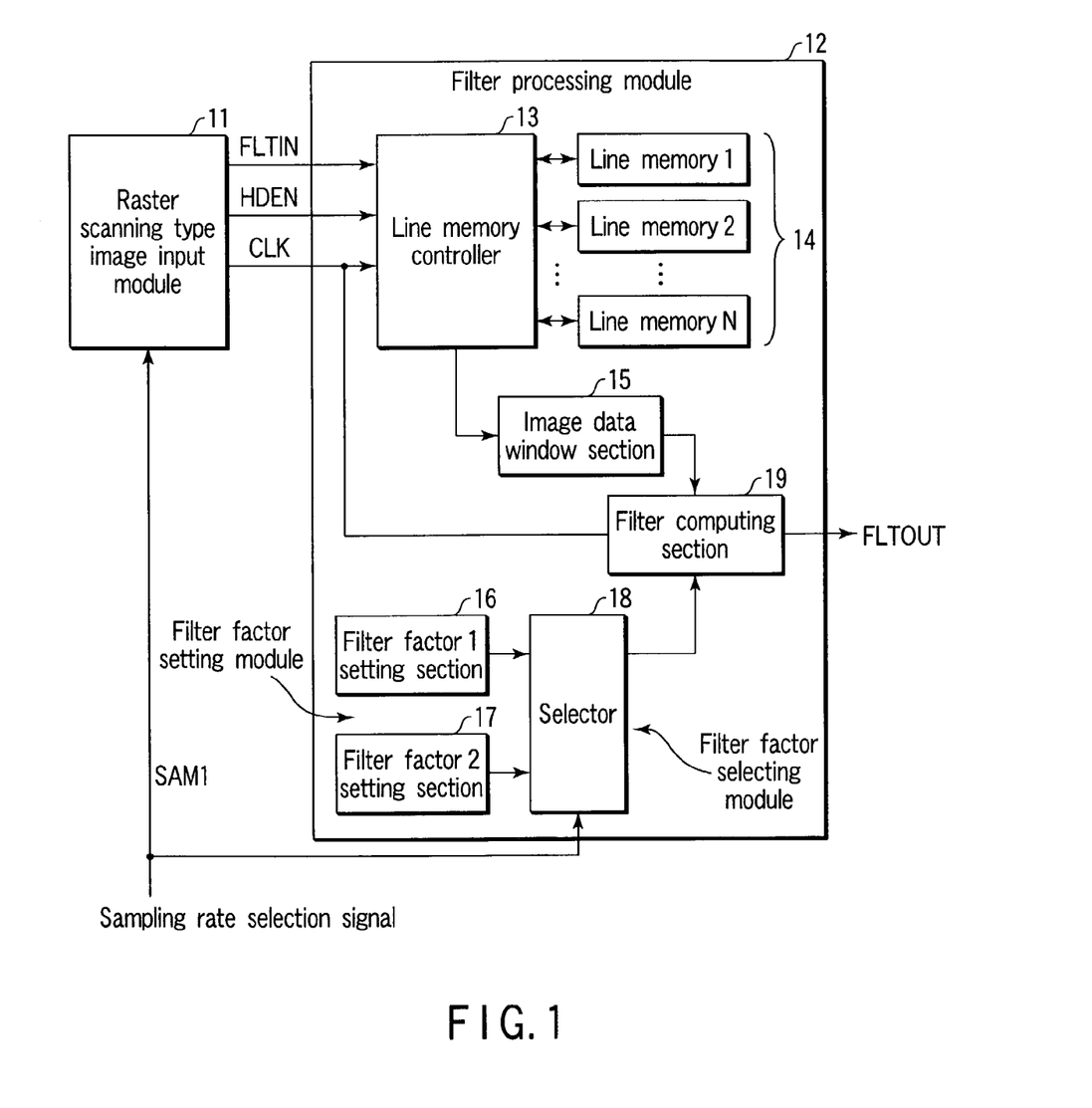
FIG. 1 is a block diagram showing a schematic configuration of first and second embodiments of an image processing device of the present invention.

FIG. 1 is a block diagram showing a schematic configuration in accordance with a first embodiment of the image processing device of the present invention.

The image processing device is configured from a raster scanning type image input module 11 which reads and outputs an image of an unillustrated manuscript at different sampling rates, and a filter processing module 12 which carries out a filter processing on the image signal which is inputted by the raster scanning type image input module 11.

At the raster scanning image input module 11, the sampling rate at the time of reading an image of a manuscript is switched by a sampling rate selection signal SAM1 from the exterior.

Here, the raster scanning type image input module 11 reads the image of the manuscript at a main scanning sampling rate of 600 dpi and a sub-scanning sampling rate of 600 dpi, when SAM1=0 (high sampling rate mode).

Further, the raster scanning type image input module 11 reads the image of the manuscript at a main scanning sampling rate of 300 dpi and a sub-scanning sampling rate of 300 dpi, when SAM1=1 (low sampling rate mode).

The raster scanning type image input module 11 synchronizes, with an image clock CLK, image data FLTIN (8 bits) of the manuscript which is read in the aforementioned high sampling rate mode or low sampling rate mode, and outputs them to the filter processing module 12.

In the raster scanning type image input module 11, while an image signal of the same line is being outputted, a main scanning direction image effective signal HDEN=0. When the output line is incremented, HDEN=1, and thereafter, HDEN=0 again in accordance with the output of the next line, and these operations are repeated.

The filter processing module 12 is configured from a line memory controller 13 to which the read image data FLTIN (8 bits) from the raster scanning type image input module 11, the main scanning direction image effective signal HDEN, and the image clock CLK are supplied; a plurality of (1–N) line memories 14 which are connected to the line memory controller 13; an image window section 15 which is connected to the line memory controller 13; a filter computing section 19 which is connected to the image data window section 15; a selector 18 which serves as a filter factor selecting module and which is connected to the filter computing section 19; and a filter factor 1 setting section 16 and a filter factor 2 setting section 17 which serve as filter factor setting modules and which are connected to the selector 18.

Here, the line memory controller 13 stores the read image data (image signal) FLTIN from the raster scanning type image output module 11 in the plurality of (1–N) line memories 14 successively for each line, in accordance with the main scanning direction image effective signal HDEN.

In this way, the latest read image data of the Nth line among the read image data from the raster scanning type image output module 11 is always held in the line memory 14 (the latest data is entered in the Nth line).

Further, the line memory controller 13 reads out the image data of W×H (pixels) with the pixel in the center, which is the object of processing, in accordance with the image clock CLK, from the image data stored in the plurality of (1–N) line memories 14 and outputs these to the image data window section 15.

Here, the image data of the W×H (pixels), which are outputted from the line memory controller 13, are latched to the image data window section 15, and the image data is outputted to the filter computing section 19.

Here, operations will be described supposing that the image data window section 15 is 13×13 (pixels) and that the number of the plurality (1–N) of line memories 14 is 14.

Figure 2:
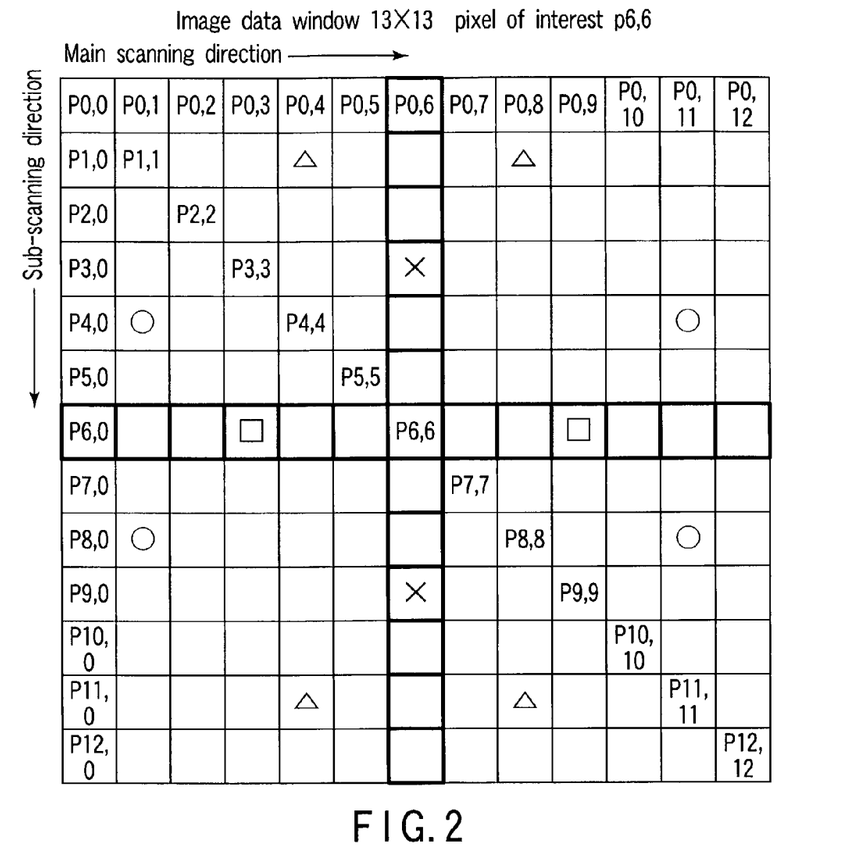
FIG. 2 is a diagram showing a schematic configuration of an image data window section of FIG. 1.

FIG. 2 is a diagram showing a schematic configuration of the image data window section 15.

In this case, at the image data window section 15, the 13 pixels from P0,0 to P0,12 are arranged in the main scanning direction, and the 13 pixels from P0,0 to P0,12 are arranged in the sub-scanning direction.

FIG. 2 shows a case in which the image data of the pixel which is the object of processing is stored in the center pixel of interest P6,6, and the image data of the W×H (pixels) surrounding the pixel which is the object of processing are stored in the respective pixels from P0,0 to P12,12.

Figure 3:
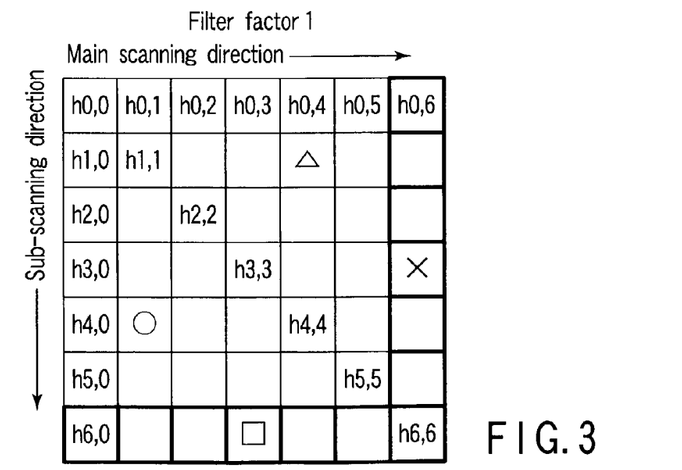
FIG. 3 is a diagram showing a schematic configuration of a filter factor 1 setting section of FIG. 1.

FIG. 3 is a diagram showing a schematic configuration of the filter factor 1 setting section 16.

Namely, a filter factor 1 of 7×7=49 elements is respectively stored in the filter factor 1 setting section 16 (the same is performed for the filter factor 2 setting section 17) in order to make the filter processing have bend-back symmetry in the main scanning direction and the sub-scanning direction with the aforementioned pixel of interest in the center.

In this case, at the filter factor 1 setting section 16 and the filter factor 2 setting section 17, respectively, the 7 elements from h0,0 to h0,6 are arranged in the main scanning direction, and the 7 elements from h0,0 to h0,6 are arranged in the sub-scanning direction.

FIG. 3 shows a case in which, in correspondence with the image data window section 15, the filter factor of the image data of the pixel which is the object of processing is stored in the element of interest h6,6, and the filter factors of the image data surrounding the pixel which is the object of processing are stored in the respective elements from h0,0 to h6,6.

Figure 4:
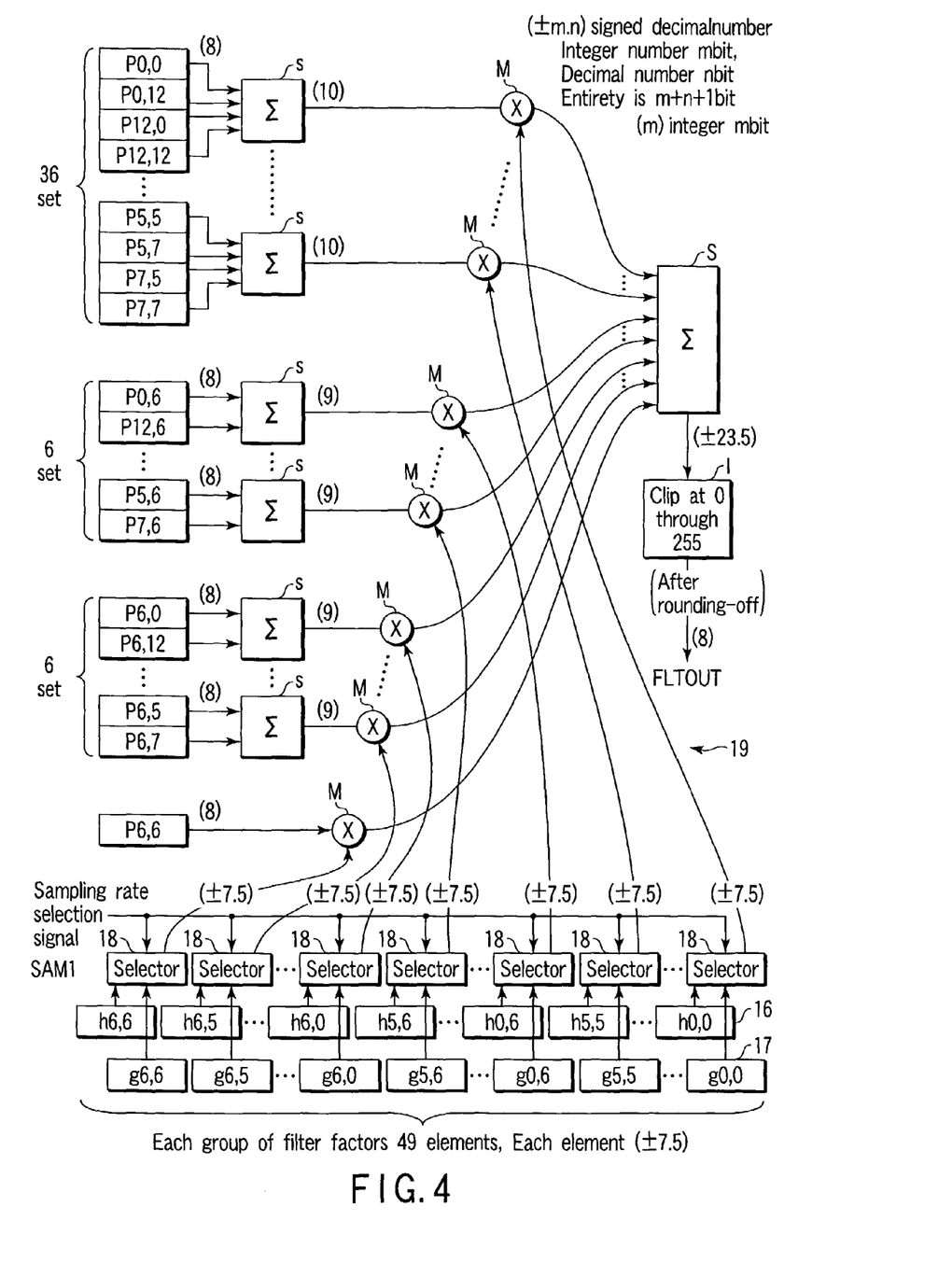
FIG. 4 is a diagram showing a schematic configuration of a filter computing section of FIG. 1.

FIG. 4 is a diagram showing a schematic configuration of the filter computing section 19 of FIG. 1.

Namely, as shown in FIG. 4, when the read image data (image signal) from the raster scanning type image output module 11 is a high sampling rate (SAM1=0), the respective elements of the filter factor h0,0 to h6,6 (here, respectively ±7.5 bits) which correspond to the filter factor 1 setting section 16 are selected via the respective selectors 18 by the sampling rate selection signal SAM1, and are outputted from the respective selectors 18.

Further, when the read image data (image signal) from the raster scanning type image output module 11 is a low sampling rate (SAM1=0), the respective elements of the filter factor from g0,0 to g6,6 (here, respectively ±7.5 bits) which correspond to the filter factor 2 setting section 17 are selected via the respective selectors 18, and are outputted from the respective selectors 18.

In the filter computing section 19, as shown in FIG. 4, after the respective image data and the filter factors (here, respectively ±7.5 bits) from the respective selectors 18 are multiplied by respective multipliers M, the total sum is calculated by a total adding machine S.

In this case, considering the symmetry of the respective pixels of 13×13 in the image data window section 15 shown in FIG. 2, the respective image data is supplied to the respective multipliers M as 10 bits or 9 bits each by respective partial adding machines s determining the partial sums of the 36 sets of P0,0, P0,12, P12,0, P12,12, . . . P5,5, P5,7, P7,5, P7,7, and the 6 sets of P0,6, P12,6, . . . P5,6, P7,0, and the 6 sets of P6,0, P6,12, . . . P6,5, P6,7, each formed by 8 bits.

Further, the 1 set of P6,6 formed by 8 bits is supplied to the multiplier M.

Thus, the total sum value from the total adding machine S is expressed as a (±m, n) signed decimal number.

Here, the integer number is m bits, the decimal number is n bits, and as a whole m+n+1 bits.

Due to this total sum value from the sum adding machine S (here, ±23.5 bits) being made to be an integer (rounded-off) by an integrator I, it becomes the integer m bits (here, 8 bits) by being clipped to 0 through 255. Thereafter, it is outputted as a filter processing result FLOUT.

Here, in order to simplify the explanation, the filter factor which does not consider bend back symmetry of the filter factor 1 setting section 16, is f1 (n1, n2), where n1=0, 1 . . . 12, and n2=0, 1 . . . 12.

Similarly, the filter factor of the filter factor 2 setting section 17 is f2 (n1, n2), where n1=0, 1 . . . 12, and n2=0, 1 . . . 12.

Further, a frequency characteristic H1 of the filter when the filter factor 1 setting section 16 is selected is expressed by expression (1):

$$H1(e^{j\pi\omega x}, e^{j\pi\omega y}) = H1(e^{j\pi fx/fNx1}, e^{j\pi fy/fNy1}) \quad (1)$$

$$= \sum_{n1=0}^{12} \sum_{n2=0}^{12} f_1(n1, n2) e^{-j\pi n1\omega x}, e^{-j\pi n2\omega y}$$

$$= |H1(e^{j\pi\omega x}, e^{j\pi\omega y})| e^{j\theta 1(\omega x, \omega y)}$$

where, $|H1(e^{j\pi\omega x}, e^{j\pi\omega y})|$ is a term expressing the amplitude characteristic, $e^{j\theta 1}(\omega x, \omega y)$ is a term expressing the phase characteristic, ωx is a main scanning normalized frequency, and ωx=−1 to 1, ωy is a sub-scanning normalized frequency, and ωy=−1 to 1, fNx1 is a main scanning Nyquist frequency, and is ½ of the main scanning sampling *rate*, and fNy1 is a sub-scanning Nyquist frequency, and is ½ the *sub-scanning* sampling *rate*.

In the same way, frequency characteristic H2 of the filter when the filter factor 2 setting section 17 is selected is expressed by expression (2):

$$H2(e^{j\pi\omega x}, e^{j\pi\omega y}) = H2(e^{j\pi fx/fNx2}, e^{j\pi fy/fNy2}) \quad (2)$$

$$= \sum_{n1=0}^{12} \sum_{n2=0}^{12} f^2(n1, n2) e^{-j\pi n1\omega x}, e^{-j\pi n2\omega y}$$

-continued
$$= |H2(e^{j\pi\omega x}, e^{j\pi\omega y})| e^{j\theta 2(\omega x, \omega y)}$$

where, $|H2(e^{j\pi\omega x}, e^{j\pi\omega y})|$ is a term expressing the amplitude characteristic, $e^{j\theta 2}$ (ωx, ωy) is a term expressing the phase characteristic, ωx is a main scanning normalized angular frequency, and ωx=−1 to 1, ωy is a sub-scanning normalized angular frequency, and ωy=−1 to 1, fNx2 is the main scanning Nyquist frequency, and is ½ of the main scanning sampling *rate*, and fNy2 is the sub-scanning Nyquist frequency, and is ½ of the *sub-scanning* sampling *rate*.

Note that the main scanning normalized angular frequency ωx and the sub-scanning normalized angular frequency ωy may be expressed as −1≦ωx, ωy≦1, respectively.

Further, if the main scanning sampling rate and the sub-scanning sampling rate at the time of a high sampling rate are respectively expressed by fSx1 and fSy1, the Nyquist frequencies are fNx1=fSx1/2 and fNy1=fSy1/2, respectively.

Similarly, if the main scanning sampling rate and the sub-scanning sampling rate at the time of a low sampling rate are respectively expressed by fSx2 and fSy2, the Nyquist frequencies are fNx2=fSx2/2 and fNy2=fSy2/2, respectively.

Based on the preceding examples, at the time of a high sampling rate,
 fSx1=600 (cpi), fNx1=300 (cpi)
 fSy1=600 (cpi), fNy1=300 (cpi)
Further, at the time of a low sampling rate,
 fSx2=300 (cpi), fNx2=150 (cpi)
 fSy2=300 (cpi), fNy2=150 (cpi)

Given that the Nyquist frequencies are (fNx, fNy), the following relational equations are established between the normalized angular frequencies ωx, ωy) and the actual frequencies (fx, fy) on the image which is read by the input system.
 (ωx, ωy)=(fx/fNx, fy/fNy)
 (fx, fy)=(fNx*ωx, fNy*ωy)

Accordingly, when the filter factor 1 and the filter factor 2 have the same factor, as shown in the equation (1) and the equation (2), from the standpoint of the normalized angular frequency, the frequency characteristics coincide, but from the standpoint of the actual frequency, they are different due to the influence of the Nyquist frequency.

Figure 5:
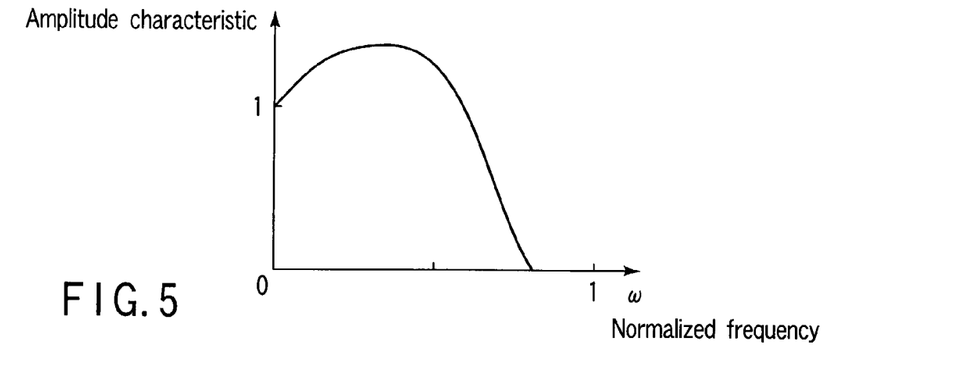
FIG. 5 is an amplitude characteristic graph which is expressed by a schematic normalized frequency to explain operations of the first embodiment of the image processing device of the present invention.

FIG. 5 shows, at this time, the amplitude characteristic by two filter factors when the frequency characteristic is considered in a one-dimensional direction and the normalized angular frequency is the abscissa.

Figure 6:
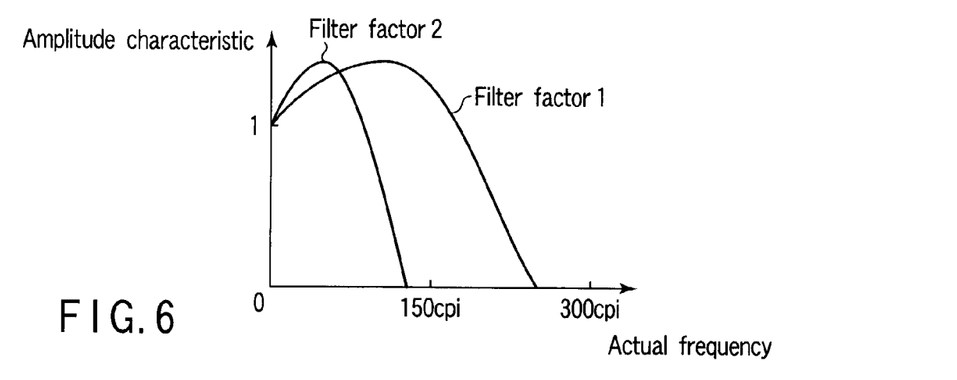
FIG. 6 is an amplitude characteristic graph which is expressed by an actual frequency to explain operations of the first embodiment of the image processing device of the present invention.

FIG. 6 shows, at this time, the amplitude characteristic by two filter factors when the frequency characteristic is considered in a one-dimensional direction and the actual frequency is the abscissa.

As can be understood from FIG. 6, because peak frequencies and the like of the filter factor 1 and the filter factor 2 are different, a difference arises between the sharpness of the images which are processed.

Here, in the present invention, the filter factor 1 setting section 16 and the filter factor 2 setting section 17 which are different from each other are prepared. The setting is switched between the setting of the filter factor 1 and the setting of the filter factor set 2, used in accordance with the switching of the sampling rate. Thus a desired sharpness function and the like are realized.

Note that, in the above, explanation is given of the filter processing of image data of any one line of RGB as the read image data from the raster scanning type image output module 11.

In actuality, the filter processing is carried out by appropriately switching between the setting of the filter factor 1 and the setting of the filter factor 2 per one line of image data of each RGB in accordance with the sampling rate of the read image data and a predetermined processing flow per one line of image data of each RGB as the read image data.

Further, when the same read manuscript is read simultaneously at different sampling rates and the filter processing is carried out at each signal channel, it suffices that the filter processing, which corresponds to the sampling rates shown in the present embodiment, is carried out for each channel.

MODIFIED EXAMPLE OF THE FIRST EMBODIMENT

The first embodiment as described above has been described by using the frequency characteristic as an example. However, as a modified example of the first embodiment, other than in a linear filter, for example, in a sequence filter or the like, by switching the sampling number (filter characteristic) in accordance with the sampling rate, effects such as a deterioration in the noise eliminating ability due to a change in the sampling rate or the like can be mitigated.

SECOND EMBODIMENT

Next, an image processing device of a second embodiment of the present invention will be described.

Note that, because the main configurations of the second embodiment are similar to those of the first embodiment shown in FIG. 1, description thereof is omitted.

In a printed photograph or an image outputted by a printer or the like, there is a periodic component (called a main frequency component) in the high frequency, other than the frequency component that is generated by a contrast of the original image or the like.

The frequency of the frequency component is (fpx, fpy), and fp=$\|$(fpy, fpx)$\|$_2. (Namely, the absolute value of the main frequency component is, for convenience, called the main frequency component.)

Note that, $\|a\|$_2 means square norm sqrt (a^2)

In the present embodiment, the main frequency component is a design parameter, and determines the frequency characteristic of the filter factor 1 and the frequency characteristic of the filter factor 2.

Here, the frequency whose amplitude characteristic is substantially zero (for example, 5% or less) is called the cutoff frequency fc.

Since the amplitude characteristic is for a two-dimensional frequency, it means that the amplitude characteristic is substantially zero in the range which is $\|$(fx, fy)$\|$_2>=fc.

In the present embodiment, a cutoff frequency fc2 of the amplitude characteristic of the filter factor 2 at the time of a low sampling rate is determined by the following expression (3) by the Nyquist frequencies (fNx2, fNy2) and (fpx, fpy).

$$fc2 < \|(2*fNx2-\text{i fpx}, 2*fNy2-fpy)\|\_2 \quad (3)$$

Further, a cutoff frequency fc1 of the amplitude characteristic of the filter factor 1 at the time of a high sampling rate is determined by the following expression (4) by the Nyquist frequencies (fpx, fpy).

$$fc1 < \|(fpx, fpy)\|\_2 \quad (4)$$

The effects of the present embodiment will be described by using the case of (fpx, fpy)=(175 (cpi), 0) as an example.

Figure 7:
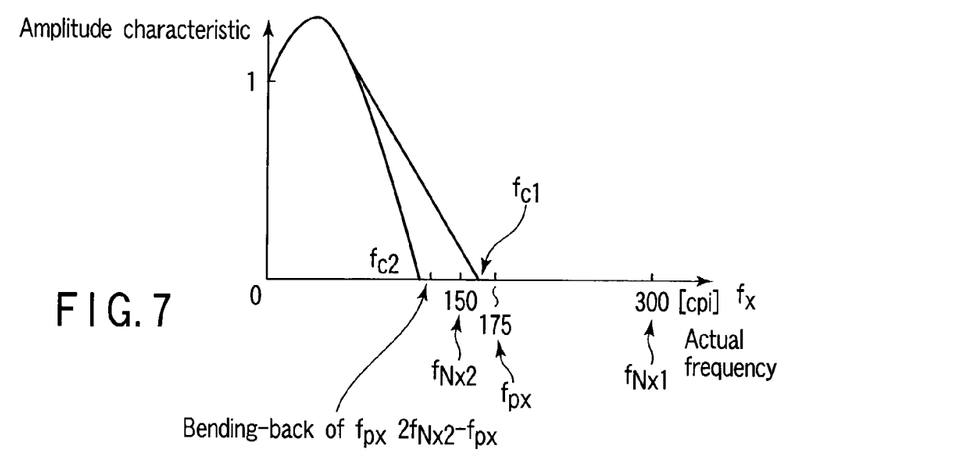
FIG. 7 is an amplitude characteristic graph which expresses a cutoff which considers bending back at the time of a low sampling rate, to explain operations of the second embodiment of the image processing device of the present invention.

FIG. 7 shows the amplitude characteristics and the like of the filter factor 1 and the filter factor 2 in the main scanning direction which are determined by the present embodiment.

Since the Nyquist frequency at the time of a low sampling rate is fNx2=150 cpi, the frequency component of (fpx, fpy) is bent back at the Nyquist frequency at the time of sampling other than the Nyquist frequency, and is shown as a peak of (2*fNx2−fpx, 2*fNy2−fpy) on the image signal.

Since the cutoff frequency fc2 of the filter factor 2 at the time of a low sampling rate satisfies the conditions of the expression (3), the peak is eliminated by the filter processing.

On the other hand, because the Nyquist frequency fNx1=300 cpi at the time of a high sampling rate, bending-back does not occur.

Further, because the cutoff frequency fc1 of the filter factor 1 satisfies the expression (4), the peak component can be eliminated.

Namely, in the present embodiment, due to filters which satisfy the expression (3) and the expression (4) being switched in accordance with the sampling rate and processing being carried out, the main frequency component can be eliminated.

In this way, when the main frequency component is eliminated, interference moire, which easily arises when some periodic processing (for example, system dither processing) is carried out in the subsequent stage of filter processing, can be suppressed.

Further, when the same read manuscript is read simultaneously at different sampling rates and the filter processing is carried out at the respective signal channels, it suffices that the filter processing which corresponds to the sampling rate which is shown in the present embodiment is carried out for each channel.

FIRST MODIFIED EXAMPLE OF THE SECOND EMBODIMENT

Further, in the second embodiment as described above, the main frequency component is (fpx, fpy). However, as a first modified example of the second embodiment, it suffices that the number of screen lines of the manuscript image is used instead of the main frequency component (fpx, fpy) in the filter processing relating to read image data of a manuscript which is screen-printed.

SECOND MODIFIED EXAMPLE OF THE SECOND EMBODIMENT

Further, in the second embodiment as described above, the conditions of the expression (3) and the expression (4) were given in relation to the setting of the cutoff frequency. However, there are cases when there are a plurality of main frequency components, or when (fpx, fpy) is indefinite.

Thus, as a second modified example of the second embodiment, in such cases, the condition is looser than those of the expression (3) and the expression (4). If the filter factor is set under the condition of $$fc2 < fc1 \quad (5)$$

it is effective for cases when the conditions of the expression (3) and the expression (4), which are shown in the above-described second embodiment, are automatically satisfied.

THIRD MODIFIED EXAMPLE OF THE SECOND EMBODIMENT

Further, in the second embodiment as described above, the effect of changing the cutoff frequency was described from the standpoint of eliminating moire. However, when a manuscript such as a character manuscript or the like in which priority is given to the resolution, image quality is improved more when the cutoff frequency fc2 at the time of a low sampling rate is set to be as high as possible.

On the other hand, at the time of a high sampling rate, there is the need to cut off the extremely high region of the high frequency region due to problems such as the S/N ratio or the like.

Thus, as a third modified example of the second embodiment, in this case, simply, a configuration in which the cutoff frequency is switched according to the sampling rate is effective.

Therefore, according to the present invention as described above, it is possible to provide an image processing device and a method for controlling the same in which, due to the filter factor, which has an appropriate frequency characteristic, being able to be selected according to the sampling rate of the input image signal and the processing flow, moire can be suppressed without requiring excessive un-sharpness processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a raster scanning type image input module which reads images from a document and outputs image signals indicating the images, at different sampling rates; and
   a filter processing module which performs filter processing on the image signals output from the raster scanning type image input module,
   wherein:
   the raster scanning type image input module outputs, in synchronism with an image clock, a first or second image signal read at a preset sampling rate or a sampling rate higher than the preset sampling rate in a main scanning direction and a sub-scanning direction of the document, when a sampling rate of reading of the document is switched by an external sampling rate selection signal and the sampling rate selection signal is in a low sampling rate mode or a high sampling rate mode, the raster scanning type image input module also outputting a main-scanning-directional image effective signal when the first or second image signal is output;
   the filter processing module includes a line memory controller supplied with the first or second image signal output from the raster scanning type image input module, the main-scanning-directional image effective signal, and the image clock, a plurality of line memories connected to the line memory controller, an image window section connected to the line memory controller, a filter computing section connected to the image window section, a selector connected to the filter computing section, and serving as a filter factor selecting module, a filter factor 1 setting section connected to the selector and serving as a filter factor setting module, and a filter factor 2 setting section connected to the selector and serving as a filter factor setting module, the filter factor selecting module selecting either the filter factor 1 setting section or the filter factor 2 setting section in accordance with the sampling rate selection signal;
   the line memory controller sequentially stores the first or second image signal, output from the raster scanning type image input module, into the line memories in units of lines in accordance with the main-scanning-directional image effective signal, reads image data of (W×H) pixels around a to-be-processed pixel, including the to-be-processed pixel, from the first or second image signal, stored in the line memories, in accordance with the image clock, and outputs the image data to the image window section, whereby the image window section latches the image data of (W×H) pixels output from the line memory controller, the latched image data being output to the filter computing section;
   the filter computing section multiplies each piece of the image data by a filter factor output from the selector as the filter factor selecting module, using a corresponding one of multipliers, and sums up resultant data pieces using a total adding machine;
   a total value output from the total adding machine is expressed as a numerical value of (±m, n), m being an integer of m bits, n being a decimal fraction of n bits, (±m, n) being accordingly (m+n+1) bits; and
   the total value is converted into an integer by an integrator and output as a filter processing result of an integer of m bits.

2. The image processing device according to claim 1, wherein the filter factor selected by the selector as the filter factor selecting module and used during the filter processing is used for switching a cutoff frequency.

3. The image processing device according to claim 2, wherein the filter factor selected by the selector as the filter factor selecting module and used during the filter processing is used for making a cutoff frequency corresponding to the first image signal lower than a cutoff frequency corresponding to the second image signal.

4. The image processing device according to claim 2, wherein:
   the filter factor selected by the selector as the filter factor selecting module and used during the filter processing is used for making a cutoff frequency corresponding to the first image signal lower than a frequency acquired by subtracting a main frequency component of an input image signal from twice a vector indicating a Nyquist frequency during processing of the first image signal; and
   the filter factor is used for making a cutoff frequency corresponding to the second image signal lower than a main frequency of the input image signal.

5. The image processing device according to claim 2, wherein:
   the filter factor selected by the selector as the filter factor selecting module and used during the filter processing is used for making a cutoff frequency corresponding to the first image signal lower than a frequency acquired by subtracting a number of screen lines contained in the document and providing the first image signal, from twice a vector indicating a Nyquist frequency during processing of the first image signal; and the filter factor is used for making a cutoff frequency corresponding to the second image signal lower than the number of the screen lines contained in the document.

6. An image processing device comprising:

raster scanning type image input means for reading images from a document and outputting image signals indicating the images, at different sampling rates; and filter processing means for performing filter processing on the image signals output from the raster scanning type image input means, wherein:

the raster scanning type image input means outputs, in synchronism with an image clock, a first or second image signal read at a preset sampling rate or a sampling rate higher than the preset sampling rate in a main scanning direction and a sub-scanning direction of the document, when a sampling rate of reading of the document is switched by an external sampling rate selection signal and the sampling rate selection signal is in a low sampling rate mode or a high sampling rate mode, the raster scanning type image input means also outputting a main-scanning-directional image effective signal when the first or second image signal is output;

the filter processing means includes a line memory controller supplied with the first or second image signal output from the raster scanning type image input means, the main-scanning-directional image effective signal, and the image clock, a plurality of line memories connected to the line memory controller, an image window section connected to the line memory controller, a filter computing section connected to the image window section, a selector connected to the filter computing section and serving as filter factor selecting means, a filter factor 1 setting section connected to the selector and serving as filter factor setting means, and a filter factor 2 setting section connected to the selector and serving as filter factor setting means, the filter factor selecting means selecting either the filter factor 1 setting section or the filter factor 2 setting section in accordance with the sampling rate selection signal;

the line memory controller sequentially stores the first or second image signal, output from the raster scanning type image input means, into the line memories in units of lines in accordance with the main-scanning-directional image effective signal, reads image data of (W×H) pixels around a to-be-processed pixel, including the to-be-processed pixel, from the first or second image signal, stored in the line memories, in accordance with the image clock, and outputs the image data to the image window section, whereby the image window section latches the image data of (W×H) pixels output from the line memory controller, the latched image data being output to the filter computing section;

the filter computing section multiplies each piece of the image data by a filter factor output from the selector as the filter factor selecting means, using a corresponding one of multipliers, and sums up resultant data pieces using a total adding machine;

a total value output from the total adding machine is expressed as a numerical value of (±m, n), m being an integer of m bits, n being a decimal fraction of n bits, (±m, n) being accordingly (m+n+1) bits; and the total value is converted into an integer by an integrator and output as a filter processing result of an integer of m bits.

7. The image processing device according to claim 6, wherein the filter factor selected by the selector as the filter factor selecting means and used during the filter processing is used for switching a cutoff frequency.

8. The image processing device according to claim 7, wherein the filter factor selected by the selector as the filter factor selecting means and used during the filter processing is used for making a cutoff frequency corresponding to the first image signal lower than a cutoff frequency corresponding to the second image signal.

9. The image processing device according to claim 7, wherein:

the filter factor selected by the selector as the filter factor selecting means and used during the filter processing is used for making a cutoff frequency corresponding to the first image signal lower than a frequency acquired by subtracting a main frequency component of an input image signal from twice a vector indicating a Nyquist frequency during processing of the first image signal; and the filter factor is used for making a cutoff frequency corresponding to the second image signal lower than a main frequency of the input image signal.

10. The image processing device according to claim 7, wherein:

the filter factor selected by the selector as the filter factor selecting means and used during the filter processing is used for making a cutoff frequency corresponding to the first image signal lower than a frequency acquired by subtracting a number of screen lines contained in the document and providing the first image signal, from twice a vector indicating a Nyquist frequency during processing of the first image signal; and the filter factor is used for making a cutoff frequency corresponding to the second image signal lower than the number of the screen lines contained in the document.

11. A control method for an image processing device comprising:

preparing raster scanning type image input means;

reading images from a document and outputting image signals indicating the images, at different sampling rates, using the raster scanning type image input means;

preparing filter processing means:

performing filter processing on the image signals output from the raster scanning type image input means, using the filter processing means, wherein:

the raster scanning type image input means outputs, in synchronism with an image clock, a first or second image signal read at a preset sampling rate or a sampling rate higher than the preset sampling rate in a main scanning direction and a sub-scanning direction of the document, when a sampling rate of reading of the document is switched by an external sampling rate selection signal and the sampling rate selection signal is in a low sampling rate mode or a high sampling rate mode, the raster scanning type image input means also outputting a main-scanning-directional image effective signal when the first or second image signal is output;

the filter processing means includes a line memory controller supplied with the first or second image signal output from the raster scanning type image input means, the main-scanning-directional image effective signal, and the image clock, a plurality of line memories connected to the line memory controller, an image window section connected to the line memory controller, a filter computing section connected to the image window section, a selector connected to the filter computing section and serving as filter factor selecting means, a filter factor 1 setting section connected to the selector and serving as filter factor setting means, and a filter factor 2 setting section connected to the selector and serving as filter factor setting means, the filter factor selecting means selecting either the filter factor 1 setting section or the filter factor 2 setting section in accordance with the sampling rate selection signal;

the line memory controller sequentially stores the first or second image signal, output from the raster scanning type image input means, into the line memories in units of lines in accordance with the main-scanning-directional image effective signal, reads image data of (W×H) pixels around a to-be-processed pixel, including the to-be-processed pixel, from the first or second image signal, stored in the line memories, in accordance with the image clock, and outputs the image data to the image window section, whereby the image window section latches the image data of (W×H) pixels output from the line memory controller, the latched image data being output to the filter computing section;

the filter computing section multiplies each piece of the image data by a filter factor output from the selector as the filter factor selecting means, using a corresponding one of multipliers, and sums up resultant data pieces using a total adding machine;

a total value output from the total adding machine is expressed as a numerical value of (±m, n), m being an integer of m bits, n being a decimal fraction of n bits, (±m, n) being accordingly (m+n+1) bits; and the total value is converted into an integer by an integrator and output as a filter processing result of an integer of m bits.

12. The control method according to claim 11, wherein the filter factor selected by the selector as the filter factor selecting means and used during the filter processing is used for switching a cutoff frequency.

13. The control method according to claim 12, wherein the filter factor selected by the selector as the filter factor selecting means and used during the filter processing is used for making a cutoff frequency corresponding to the first image signal lower than a cutoff frequency corresponding to the second image signal.

14. The control method according to claim 12, wherein:

the filter factor selected by the selector as the filter factor selecting means and used during the filter processing is used for making a cutoff frequency corresponding to the first image signal lower than a frequency acquired by subtracting a main frequency component of an input image signal from twice a vector indicating a Nyquist frequency during processing of the first image signal; and the filter factor is used for making a cutoff frequency corresponding to the second image signal lower than a main frequency of the input image signal.

15. The control method according to claim 12, wherein:

the filter factor selected by the selector as the filter factor selecting means and used during the filter processing is used for making a cutoff frequency corresponding to the first image signal lower than a frequency acquired by subtracting a number of screen lines contained in the document and providing the first image signal, from twice a vector indicating a Nyquist frequency during processing of the first image signal; and the filter factor is used for making a cutoff frequency corresponding to the second image signal lower than the number of the screen lines contained in the document.

* * * * *